United States Patent [19]

Richardson et al.

[11] Patent Number: 4,696,865

[45] Date of Patent: Sep. 29, 1987

[54] HOLLOW COPOLYAMIDE ARTICLE

[75] Inventors: John C. Richardson, St. Louis, Mo.; Morris Salame, Windsor, Conn.

[73] Assignee: Monsanto Company, St. Louis, Mo.

[21] Appl. No.: 602,318

[22] Filed: Apr. 20, 1984

[51] Int. Cl.$^4$ .................... B32B 27/08; C08G 69/08
[52] U.S. Cl. .................. 428/474.4; 428/35; 528/310
[58] Field of Search ............. 528/310; 428/35, 474.4

[56] References Cited

U.S. PATENT DOCUMENTS

| | | | |
|---|---|---|---|
| 3,549,601 | 12/1970 | Fowell | 260/78 |
| 3,597,400 | 8/1971 | Kashiro et al. | 260/78 R |
| 4,022,756 | 5/1977 | Chapman et al. | 260/78 R |
| 4,255,560 | 3/1981 | Meyer et al. | 528/339 |
| 4,261,473 | 4/1981 | Yamada et al. | 215/1 C |
| 4,288,478 | 9/1981 | Kinoshita et al. | 428/35 |

FOREIGN PATENT DOCUMENTS 5250 1/1978 Japan.
6355 1/1978 Japan.

*Primary Examiner*—John E. Kittle
*Assistant Examiner*—Patrick J. Ryan
*Attorney, Agent, or Firm*—L. L. Limpus

[57] ABSTRACT

A new article of manufacture in the form of a hollow, shaped, blow molded article formed of a composition comprising a copolyamide of hexamethylene terephthalamide and hexamethylene isophthalamide, the ratio of terephthalic acid to isophthalic acid used in forming the copolyamide being between about 1.0 to about 1.9. Such article may be formed from a precursor in the form of a hollow, shaped, tubular preform formed of such copolyamide composition.

12 Claims, No Drawings

HOLLOW COPOLYAMIDE ARTICLE

CROSS-REFERENCE TO RELATED APPLICATION

"Hollow, Molecuarly Oriented Coplyamide Article", J. C. Richardson et al, Ser. No. 06/602,319, filed April 20, 1984.

BACKGROUND OF THE INVENTION

This invention relates to copolyamides of hexamethylene terephthalamide (6TA) and hexamethylene isophthalamide (6IA) and more particularly to hollow, shaped, blow molded articles formed of such copolyamides.

Containers formed of thermoplastic barrier polymers for packaging environmentally sensitive food and highly permeable non-food products are known. Barrier polymers are materials possessing significant resistance to permeation of one or more fluids such as oxygen and carbon dioxide gas, water vapor, hydrocarbons and organic solvents and the like. Products which have been packaged or are potentially packageable in articles formed of barrier polymers include carbonated soft drinks, beer, salad oils, nuts, jams, coffee, medicines, household chemicals, agricultural fluids, cleaning solvents, industrial adhesives and the like. Particularly demanding food packaging applications are those required to accommodate hot fill (90°-100° C.) and autoclave (125° C.) temperatures for sterilization, such as encountered with baby foods, canned goods such as vegetables and soups and the like. Barrier polymers molded into containers such as bottles, cans and like shapes which have been used in these applications include acrylonitrile copolymers containing more than 50 weight percent acrylonitrile, biaxially oriented chemically modified and unmodified polyethylene terephthalate and high density polyethylene surface treated with fluorine. Laminates containing plural layers with a barrier polymer such as vinylidene chloride or ethylene-vinyl alcohol as one layer have also been used.

In spite of progress to date, there remains a desire in the marketplace for cost-effective barrier polymer packages having an improved balance of properties including strength, solvent and gas barrier resistance and, in the case of foods, the capability to withstand high temperatures.

Japanese (laid-open) patent application No. 79472/76 of Toray Industries, Inc. recognizes copolyamides of hexamethylene terephthalamide (hereinafter referrerd to as "6TA") (20-65 weight %) and hexamethylene isophthalamide (hereinafter referred to as "6IA") (35-55 weight %), optionally including epsilon caprolactam, in the form of biaxially stretched packaging film having superior oxygen, water vapor, etc. gas barrier properties and resistance to boiling water and high retort temperatures. This publication, however, teaches such copolyamides only as thin, wrapping films having a thickness of about 0.7-0.8 mils (0.017-0.020 mm) initially formed by depositing and solidifying the melt on a casting drum.

U.S. Pat. No. 4,022,756 discloses such copolyamides as molecularly oriented fibers.

SUMMARY OF THE INVENTION

Now, however, improvements have been made in copolyamide resins of 6TA and 6IA which facilitate formation therefrom of packaging materials other than film.

Accordingly, it is a principal object of this invention to provide a plastic packaging innovation in the form of a new article of manufacture formed from such copolyamides of 6TA and 6IA.

Another object is to provide such an article of manufacture in the form of a hollow, shaped, blow molded article, such as a container in the form of a relatively thick walled bottle, possessing excellent barrier properties which are better than those of most other barrier polymers which have been commercialized, insofar as resisting the permeation of fluids (either into or out of the article) adversely affecting the quality of products packaged therein.

A further object is to provide a molded preform formed of such copolyamide which is capable of being reshaped to such a hollow article.

An additional object is to tailor such copolyamides from those disclosed in the prior packaging art to overcome processing difficulties encountered in forming relatively thick-walled articles and render them suitable for blow molding.

These and other objects are accomplished in the present invention by providing a new article of manufacture comprising a hollow, shaped, blow molded article formed of a composition comprising a copolyamide of hexamethylene terephthalamide and hexamethylene isophthalamide, the weight ratio of terephthalaic acid to isophthalic acid used in forming the copolyamide being between about 1.0 to about 1.9 and preferably between 1 to 1.5. The article has walls which are preferably heat set to provide a crystallinity level in the copolyamide of about 20 to 70 percent.

The copolyamide articles of the invention typically have: oxygen permeability no greater than $$1.5 \frac{\text{(cc) (mil)}}{\text{(100 sq. in.) (day) (atm)}},$$

measured at 23° C. and 50% relative humidity, water permeability no greater than $$3.5 \frac{\text{(gm) (mil)}}{\text{(100 sq. in.) (day)}},$$

measured at 38° C. and hydrocarbon permeability, using heptane as the hydrocarbon, no greater than $$0.2 \frac{\text{(gm) (mil)}}{\text{(100 sq. in.) (day)}},$$

measured at 23° C.

From the standpoint of blow moldable copolyamide preparation, a special polymerization process is employed to provide a material having a high molecular weight and relatively broad molecular weight distribution whereby a tubular distendable parison can be readily formed for fabrication directly into the hollow article. A parison of such material has adequate melt strength to be self supporting and to avoid collapsing inwardly on itself before blow molding. Such polymerization process utilizes a capping agent to promote branching between copolyamide polymer chains during polymerization and optionally may include a finishing step to increase the molecular weight of the initially polymerized material.

DETAILED DESCRIPTION OF PREFERRED EMBODIMENTS

The hollow, blow molded articles of this invention are made from a random copolyamide prepared from hexamethylene diamine, terephthalic acid and isophthalic acid. Such copolyamide consists essentially of chemically combined, recurring units of hexamethylene terephthalamide and hexamethylene isophthalamide. The formula for each such unit is disclosed in U.S. Pat. No. 4,022,756, col. 2, lines 50 to 60, the content of which is incorporated herein by reference.

In order to provide the barrier properties required for the broad range of packaging applications contemplated by the articles of this invention, the ratio of terephthalic acid to isophthalic acid used in forming the copolyamide must be between about 1.0 to about 1.9 and preferably between 1 to 1.5. These ratios are obtained when the weight ratio of 6TA units to 6IA units in the copolyamide copolymer is from 50:50 to 65:35. The preferred composition is 56:44 6TA/6IA.

The 6TA/6IA polymers of the hollow, blow molded articles of this invention are prepared by melt polymerizing an aqueous solution containing the appropriate amounts of a mixture of 6TA salt and 6IA salt under conditions of controlled time, temperature and pressure. Preferably, polymerization is conducted in three cycles. During the first cycle the reaction mixture is heated from room temperature to about 140-242° C. while under a pressure of 140-350 psig (964.6-2411.5 kPa). During the second cycle the reaction mixture is heated to about 300° C. while holding the pressure substantially constant at about 350 psig (2411.5 kPa). During the third cycle the temperature is allowed to increase slightly, for example, an additional 10° to 20° C., while the pressure is reduced to atmospheric. After completion of the third cycle the resulting molten mass may be optionally held at atmospheric pressure at or above its melting temperature for a period of time sufficient to bring it to equilibrium, for example, 30 minutes. The optimum time, temperature and pressure involved in conducting the polymerization cycles will vary somewhat depending on the melting point of the particular 6TA/6IA copolymer being prepared.

The polymerization process for preparing the copolyamides of the blow molded articles of this invention departs from the prior art in the polymerzation recipe used in forming such copolymers. A chemical capping agent is included in the polymerization charge to chemically limit the molecular weight of the copolyamide being formed and facilitate its subsequent melt processing into precursors (to be further described) which can be blow molded into the hollow articles of this invention. Suitable usable capping agents include monofunctional hydroxides which are thermally stable and remain liquid during polymerization formation of the copolyamides. Such hydroxides comprise metal hydroxides, e.g. those wherein the metal is a member of Group 1A of the Perioic Table (i.e. sodium, potassium, lithium, etc.), phenol, naphthol and the like. Sodium hydroxide is preferred.

The concentration of the capping agent used should be adequate to provide 10 to 100 equivalents per million grams of polymer.

An optional step in synthesizing the copolyamides of the articles of this invention involves further polymerizing the capped polymer referenced above while such polymer is in the solid state until its viscosity is just below the level where it becomes impossible to pump during melt processing. The preferred level is that wherein the polymer has an inherent viscosity of about 1.5 grams per deciliter measured according to a procedure further described hereinafter. Such further polymerization is required when the hollow articles being formed are molded from a freely pendant, hollow tubular parison suspended from an extrusion nozzle which must have enough melt strength to be able to support itself without tearing away from the nozzle, as well as avoiding necking down or collapsing of the tubular shape into a solid, non-tubular mass. This final polymerization step serves to break polymer chains within the already capped ends and permits the several pieces to randomly join with other broken chains thereby increasing molecular weight and broadening molecular weight distribution such that it can be formed into a freely pendant parison without the difficulties just described. This optional step of polymerizing the already formed solid copolyamide is accomplished by holding the polymer at elevated temperature on the order of about 240° C. while under negative pressure, preferably full vacuum, and exposed to an inert gas sparge. Temperatures above such 240° C. tend to degrade the copolyamide polymer at the 6TA/6IA ratios required for optimum barrier packaging.

In addition to the capping agent for molecular weight control, the copolyamides which are the subject of this invention may contain other additives in minor proportions, e.g. heat and light stabilizers, cross-linking agents, toughening agents such as rubber for increasing strength and the like.

The hollow, shaped, blow molded articles of this invention for packaging environmentally sensitive food and highly permeable, non-food products may be provided in a variety of sizes and shapes, that chosen frequently being determined by the nature of the product being packaged and the use contemplated for the package. Such articles comprise relative large and small one-trip and reusable shipping and storage containers such as bottles, tubs, wide and narrow mouth jars, cups, drums, and like shapes. The preferred configuration is a bottle or can. Containers of single, unlayered walls are preferred although layered and coated structures are also within the scope of this invention provided that one thickness is formed of the copolyamide previously described. The sidewall thickness of the hollow, copolyamide article must be adequate to provide the barrier to permeability desired and, when present as a single, non-laminated structure, must also be adequate to withstand the abuse imposed by filling procedures and throughout distribution to the customer. A sidewall thickness of at least 3 mils (0.076 mm) is required for barrier and at least about 10 mils (0.254 mm), preferably 14 to 20 mils (0.36 to 0.50 mm) is usually adequate for one-trip, unlaminated structures.

The hollow articles of this invention may be molecularly oriented in two directions, i.e. lengthwise and breadthwise, in order to provide increased crystallinity and therefore improved barrier properties. Molecular orientation is developed by stretching the copolyamide in two directions while the plastic is at molecular orientation temperature during formation of the hollow article. The molecular orientation temperature range of the particular class of copolyamides involved in this invention is above the glass transition temperature (Tg) but below the crystallization temperature (Tc). This range for the copolyamides of the invention is from 20° C.

above Tg to 20° C. below Tc. The preferred range is 135° to 165° C.

The hollow articles of this invention can be shaped by any of the know fabricating techniques employing a blow molding step. For example, the copolyamide 6TA/6IA may be melted in an extruder and forced while in melt form through a downwardly directed annular shaping orifice to form a hollow tubular parison suspended in the orifice and which is then enclosed within cooperating sections of a blow mold prior to severance from the orifice. Air under pressure is then introduced into the confined parison which is at elevated temperature to force it outwardly against cool walls of the mold cavity whereby the plastic is cooled to a rigid yet resilient shape over a brief period of time on the order of a minute. Alternatively, the articles of the invention may be formed by the well known injection-blow molding process wherein a hollow, tubular preform of the copolyamide is injection molded and then immediately thereafter while at molding temperature is confined within a blow mold cavity and distended outwardly into the form of the article or, alternatively, such tubular preform may be cooled to room temperature and thereafter increased to molding temperature at the convenience of the fabricator prior to blow molding into the article.

To improve the barrier properties inherently provided by the polymeric structure of the copolyamide even further from those present after blow molding, the crystallinity level of the copolyamide can be increased to a level of between about 50 to about 70% by heat setting the shaped article. This may be accomplished by exposing the article to an elevated temperature of between about 120° to about 170° C. for a time sufficient to increase the crystallinity level for the particular 6TA/6IA copolyamide involved to the desired amount.

The following procedures were used in obtaining the values for the various properties presented in the Examples following:

Oxygen permeability: $\frac{(cc) (mil)}{(100 \text{ sq. in.}) (day) (atm)}$ at 23° C., 50% relative humidity. An Ox-Tran 100 oxygen permeability cell available from Mocon Co., Minneapolis, Minn. was used.

Water permeability-direct liquid contact.

$\frac{(gm) (mil)}{(100 \text{ sq. in.}) (day)}$ at 38° C.

A Mocon water permeability cell was used.

Hydrocarbon permeability-direct contact with heptane.

$\frac{(gm) (mil)}{(100 \text{ sq. in.}) (day)}$ at 23° C.

Blow molded bottles were used to make this measurement. Melt viscosity-capillary rheometer by Instron. Crystallinity-by X-ray diffraction. Inherent viscosity: A solution of 0.125 gr of polymer in 25 ml of a 40/60 weight percent solution of symmetrical tetrachloroethane and phenol was prepared and filtered. The drop time for the solution with (T) and without (To) dissolved polymer to pass through an orifice was noted and the inherent viscosity in grams per deciliter calculated from the equation:

$$n^\circ = \frac{\ln \frac{T}{T_o}}{c}$$

where c is the concentration in grams per 100 ml. of solvent.

The invention is further described with reference to the following Examples which are for illustration only and are not intended to imply any limitation or restriction on the invention. Unless otherwise indicated, all quantitites and percentages are expressed by weight.

EXAMPLE 1

This Example illustrates the preparation in water of a 50/50 salt of 6TA/6IA which is the material from which the copolyamide of hexamethylene terphthalamide/isophthalamide is polymerized.

480 pounds (217.9 kg) of an 85% solution of hexamethylene diamine in water were pumped to a stirred tank containing 460 gallons (1743 l) of water at about 20° C. 291 pounds (132 kg) of terephthalic acid (100% polymer grade) and 291 pounds (132 kg) of isophthalic acid (100% polymer grade) were then charged and the contents stirred for about one hour without external heat followed by water flushing of the walls above the liquid level to avoid any residual acid remaining thereon. The pH was adjusted to 7.30±0.01 with an acid mixture of 50/50 TA/IA or diamine. The dilute salt solution (about 20%) was then increased in salt concentration by removing water through evaporation in an agitated vessel equipped with a coil connected to 40 psig (275.8 kPa) steam. Eighty five gallons (332 l) of the dilute salt solution were initially charged to such vessel and then as evaporation proceeded 95 more gallons (360 l) were charged. Also charged were additives intended to function in the subsequent polymerization step-i.e. 100 grams of a silicone antifoam agent available from Union Carbide as SAG 530, 79 grams of a 5% solution in water of manganese hypophosphite (to improve polymer UV light stability), 454 grams of a 10% solution in water of benzene phosphonic acid (to promote light crosslinking of the polymer) and 1108 grams of a 25% solution in water of sodium hydroxide capping agent. After about thirty minutes, the salt concentration was about 75%.

EXAMPLE 2

This Example illustrates preparation of a copolyamide of 6TA/6IA having a weight ratio of 6TA to 6IA of 50:50, i.e. 6TA/6IA (50/50).

The contents of the evaporator (362 pounds (164 kg) of salt-100% basis) was charged to a stainless steel, high pressure, jacketed autoclave provided with a Dowtherm jacket heating system. The autoclave ingredients were slowly heated to a temperature of 260–270° C. at which point the pressure was 350 psig. (2414 kPa). At 242° C., steam began to boil off as the pressure increased to 350 psig (2414 kPA). The ingredients were continuously agitated by means of a wall-scraping blade contained within the autoclave. After approximately 80 minutes at 350 psig (2414 kPA), the pressure was gradually reduced to atmospheric over approximately 30 minutes while allowing the melt contents to rise and level out at about 325° C. The agitator was stopped and an inert gas blanket at 150–200 psig (1035–1379 kPa)was imposed on the 325° C. melt contents to force the molten polymer in web form out of the autoclave onto a casting wheel turning at about 53.5 ft./min. (0.27m/sec.) having a surface temperature maintained at about 85° C. The solidified polymer was fed from the wheel to a commercial dicer for comminution to pellet form. The intrinsic viscosity of the polymer was 0.858 grams per deciliter.

EXAMPLE 3

This Example illustrates preparation via injection-stretch blow molding of hollow, shaped, molecularly oriented blow molded articles formed of the hexamethylene terephthalamide/isophthalamide, copolyamide of Example 2.

The 6TA/6IA (50/50) polymer of Example 2 was dried under vacuum to no greater than 0.25% water, melted in a one inch (2.54 cm) diameter heated injection molding unit and pumped while molten into an annular space in a cooled injection mold having a shape corresponding to a tubular preform generally conforming to the shape shown in FIG. 1 of U. S. 3,900,120 which is incorporated herein by reference. After cooling in the mold to set the copolyamide plastic the ejected tubular preforms had a shape corresponding to the mold cavity, i.e. a closed, hemispherical bottom at one end and a molded threaded wall surrounding the opposite open end.

The body of a molded tubular preform of 6TA/6IA (50/50) copolyamide below the threaded end was then reheated in an oven equipped with infrared heaters while rotating about its lengthwise axis until the wall of the preform reached about 150° C., which is within the molecular orientation temperature range of the polyamide. It was then immediately placed between partible sections of a blow mold having a cavity with a bottle-shaped periphery and, after mold closing, was reshaped by initially conventionally advancing a rod into the preform and forcing it against the inner surface of the closed end to stretch the preform axially until the closed end contacted the base of the mold cavity, followed immediately by expansion outwardly with pressurized air against the peripheral surface of such mold cavity. The cavity wall was cooled in conventional manner and, after setting the copolyamide through contact with such cavity surface for a brief period, the blow mold was opened to discharge the shaped bottle. Molecularly oriented walls of the shaped bottle were optically clear to the human eye and after testing the bottes were found to have the following representative permeability properties (units and measurement conditions as previously described).

Oxygen: 0.9
Water: 3.0
Heptane: 0.1

Since made of the same material but not heat set for crystallinity increase or molecularly oriented, the barrier properties of the preform though not specifically measured are predicted to be within the maximum limits previously stated but somewhat lower than those reported above for the bottles.

EXAMPLE 4

This Example illustrates preparation of a copolyamide of 6TA/6IA having a weight ratio of 6TA/6IA of 56:44, i.e. 6TA/6IA (56/44) which is especially tailored during preparation to permit direct blow molding from a freely pendant, hollow, tubular parison.

The procedure of Examples 1 and 2 was repeated through the end of the melt polymerization cycle except that the quantities of TA and IA used were proportionately adjusted to provide the 6TA/6IA (56/44) material. The minor constituent quantities were used at the same levels as in Example 2.

The pelleted, capped copolyamide polymer was further polymerized in the solid state to promote branching and increase the molecular weight of the polymer so as to possess a broad melting point. This was accomplished by exposing the polymer to 240° C. in an oven under substantially full vacuum of 29.92 inches (80 cm) of mercury while sparging with about two cu.ft. (0.06 cu meters) of nitrogen gas for a period of about 10 hours. Based on the amount and content of components recovered in a trap between the oven and vacuum source, the resulting polymer was calculated to have an inherent viscosity of about 1.5 grams per deciliter.

EXAMPLE 5

This Example illustrates preparation, via extrusion-blow molding, of hollow, shaped articles blow molded directly from a tubular parison at elevated shaping temperature.

The capped, branched, polymer of Example 4 was dried as in Example 3 and melted in a 1½ in. (3.8 cm.) diameter rotary screw extruder. The melt during extrusion was always at least 300° C. and usually between about 310-325° C. The melt was forced through a conventional extruder head and an annular shaping die into a downwardly directed, freely hanging, hollow, tubular, distendable parison. The parison was completely free of contact with any supporting means but capable of being enclosed within a blow mold. The continuously issuing distensible parison, which was essentially at the melt temperature had a length on the order of 4-6 in. (10-15 cm) and was visually observed as supporting its own weight while attached to the melt in the extruder head at the annular nozzle. No detrimental inward collapsing of the walls of the tubular parison on itself to form a non-tubular solid mass was observed. When the parison length was slightly greater than that of the bottle to be formed, partible sections of a blow mold having an internal cavity with cooled wall surfaces were closed around the parison while pinching the forward end shut between lands at the base of the mold. The trailing end was then severed from the balance of the melt in the extruder head without pinching the walls shut, thus leaving an open end. A conventional blow nozzle in communication with a source of pressurized air was then lowered onto the open end of the enclosed parison and air under pressure was introduced therein to distend the parison outwardly against the surface of the mold cavity. The partible sections were then separated and four ounce (120 cc.) Boston-round bottles were ejected which were visually observed to have optically clear walls. The barrier properties of the bottles were measured according to the procedures and at the conditions previously described and the following results were obtained (units as previously stated):

Oxygen 1.0
Water Vapor: 3.5
Heptane 0.1

EXAMPLE 6

This comparative Example is not according to the invention and illustrates the inoperability of a copolyamide of 6TA/6IA (50/50) which had not been especially tailored for blow molding directly from a hollow, tubular parison at elevated forming temperature.

Copolyamide was prepared according to Examples 1 and 2 except that sodium hydroxide capping agent was not included in the polymerization recipe. Such copolyamide was then melted in the same extrusion-blow molding system of Example 5 and a tubular parison was attempted to be formed. Formation of such a freely hanging distensible parison, however, was not possible. The melt was observed to have inadequate strength to support its own weight in the extrusion nozzle with the result that at lengths adequate to form four ounce (120 cc) Boston round bottles, the parison would neck down, close up and/or tear and drop out of the extrusion nozzle so that blow molding a hollow article therefrom was not possible.

EXAMPLE 7

This invention Example illustrates the increase in crystallinity of the copolyamide of the hollow, blow molded articles of the invention which can be achieved by heat setting.

Optically clear bottles prepared according to Example 5 were measured according to the procedure previously described and found to have representative crystallinity levels of from about 5 to 10%. These bottles were allowed to set for a period at ambient room temperature conditions and were then subsequently placed in an oven for three minutes at 170° C. After removal and cooling to room temperature, the bottle walls were visually observed to be optically opaque, which would dictate a performance use not requiring clarity, for example in packaging beer or in use as a can. The crystallinity level of the heat set bottles was measured and found to be 55-65%, which represents an increase of 700% over that obtained before heat setting. The barrier properties of the heat set bottles were measured and found to be significantly improved over those of the non-heat set bottles of Example 5. The results obtained were as follows:

$O_2$: 0.35
Water: 2.0
Heptane: <0.1

While certain specific embodiments of the invention have been described with particularity herein, it will be recognized that various modifications thereof will occur to those skilled in the art The scope of the invention, therefore, is to be limited solely by the scope of the following claims.

We claim:

1. A new article of manufacture comprising a hollow, shaped, blow molded article formed of a composition comprising a copolyamide of hexamethylene terephthalamide and hexamethylene isophthalamide, the ratio of terephthalic acid to isophthalic acid used in forming the copolyamide being between about 1.0 to about 1.9, said article having the following barrier properties: oxygen permeability no greater than $$1.5 \frac{(cc)(mil)}{(100 \text{ sq. in.})(day)(atm)},$$

measured at 23° C., 50% relative humidity; water permeability no greater than $$3.5 \frac{(gm)(ml)}{(100 \text{ sq. in.})(day)},$$

measured at 30° C., and hydrocarbon permeability as measured using heptane no greater than $$0.2 \frac{(gm)(mil)}{(100 \text{ sq. in.})(day)},$$

measured at 23° C.

2. The article of claim 1 wherein said ratio is between 1 to 1.5.

3. The article of claims 1, or 2 in the form of a container.

4. The article of claim 3 wherein a wall portion thereof has a crystallinity level of between about 20 to about 70%.

5. The article of claim 4 having been molded from a freely pendant parison.

6. The article of claim 5 in the form of a bottle.

7. A new article of manufacture comprising a hollow, shaped, tubular preform of a composition comprising a copolyamide of hexamethylene terephthalamide and hexamethylene isophthalamide, the ratio of terephthalic acid to isophthalic acid used in forming the copolyamide being between about 1.0 to about 1.9, said article having the following barrier properties: oxygen permeability no greater than $$1.5 \frac{(cc)(mil)}{(100 \text{ sq. in.})(day)(atm)},$$

measured at 23° C., 50% relative humidity, water permeability no greater than $$3.5 \frac{(gm)(mil)}{(100 \text{ sq. in.})(day)},$$

measured at 30° C., and hydrocarbon permeability as measured using heptane no greater than $$0.2 \frac{(gm)(mil)}{(100 \text{ sq. in.})(day)},$$

measured at 23° C.

8. The preform of claim 7 wherein said ratio is between 1 to 1.5.

9. The preform of claim 7, or 8 having been formed by injection molding.

10. A new article of manufacture comprising a hollow, shaped, blow molded article formed of capped copolyamide which has been polymerized in the solid state, said copolyamide comprising hexamethylene terephthalamide and hexamethylene isophthalamide, the ratio of terephthalic acid to isophthalic acid used in forming the copolyamide being between about 1.0 to about 1.9.

11. The article of claim 10 wherein the copolyamide has an inherent viscosity of at least about 15. grams per deciliter.

12. The article of claim 10 having the following barrier properties: oxygen permeability no greater than $$1.5 \frac{(cc)(mil)}{(100 \text{ sq. in.})(day)(atm)},$$

measured at 23° C., 50% relative humidity; water permeability no greater than $$3.5 \frac{(gm)(mil)}{(100 \text{ sq. in.})(day)},$$

measured at 30° C. and hydrocarbon permeability as measured using heptane no greater than $$0.2 \frac{(gm)(mil)}{(100 \text{ sq. in.})(day)},$$

measured at 23° C.

* * * * *